(12) United States Patent
Bernal et al.

(10) Patent No.: US 9,188,785 B2
(45) Date of Patent: Nov. 17, 2015

(54) SINGLE-PIXEL CAMERA ARCHITECTURE WITH SIMULTANEOUS MULTI-BAND ACQUISITION

(71) Applicant: Xerox Corporation, Norwalk, CT (US)

(72) Inventors: Edgar A. Bernal, Webster, NY (US); Lalit Keshav Mestha, Fairport, NY (US); Paul R. Austin, Webster, NY (US); Robert Paul Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 151 days.

(21) Appl. No.: 13/842,027

(22) Filed: Mar. 15, 2013

(65) Prior Publication Data

US 2014/0267881 A1   Sep. 18, 2014

(51) Int. Cl.
| | | |
|---|---|---|
| G02B 27/10 | (2006.01) | |
| G02B 27/14 | (2006.01) | |
| H04N 3/08 | (2006.01) | |
| H04N 9/09 | (2006.01) | |
| H04N 9/10 | (2006.01) | |

(52) U.S. Cl.
CPC .......... *G02B 27/1013* (2013.01); *G02B 27/141* (2013.01); *H04N 3/08* (2013.01); *H04N 9/09* (2013.01); *H04N 9/10* (2013.01)

(58) Field of Classification Search
CPC ............. H04N 3/08; H04N 9/09; H04N 9/10; H04N 5/2254; G02B 27/1013; G02B 27/141; G01J 2003/2813; G01J 2005/0077; G01J 5/0846
See application file for complete search history.

(56) References Cited

U.S. PATENT DOCUMENTS

| | | | |
|---|---|---|---|
| 8,199,244 B2 | 6/2012 | Baraniuk et al. | |
| 2011/0025870 A1* | 2/2011 | Baraniuk et al. | 348/222.1 |
| 2012/0038789 A1* | 2/2012 | Kelly et al. | 348/226.1 |

OTHER PUBLICATIONS

Candes, E. J., "Compressive Sampling", Proceedings of the International Congress of Mathematicians, Madrid, Spain, 2006, pp. 1-20.
Duarte, M. F., et al, "Single-Pixel Imaging via Compressive Sampling", IEEE Signal Processing Magazine, vol. 83, Mar. 2008, pp. 1-19.
Wu, Y. et al., "Fabrication and characterization of a compressive-sampling multispectral imaging system", Optical Engineering, vol. 48, Dec. 2009, 123201-1-123201-12.
"DLP™ System Optics", Texas Instruments Application Report, DLPA022-Jul. 2010, Copyright 2010, Texas Instruments Incorporated, pp. 1-26.

* cited by examiner

*Primary Examiner* — Yara B Green
(74) *Attorney, Agent, or Firm* — Fay Sharpe LLP

(57) ABSTRACT

A system is provided comprising: a light field emanating from a scene and a positive imaging lens focusing light from the light field onto a DMD array. A first collector lens directs the spatially modulated light to a first photodetector having a spectral sensitivity to a first spectral band. The first photodetector senses the directed light from the first pixel-wise multiplication and produces a signal representing a first inner product between the light incident on the DMD and the first basis function for the first spectral band. A second collector lens directs the spatially modulated light to a second photodetector having a spectral sensitivity to a second spectral band. The second photodetector senses the directed light from the first pixel-wise multiplication and produces a signal representing a first inner product between the light incident on the DMD and the first basis function for the second spectral band.

6 Claims, 2 Drawing Sheets

SINGLE-PIXEL CAMERA ARCHITECTURE WITH SIMULTANEOUS MULTI-BAND ACQUISITION

BACKGROUND

Current single-pixel camera architectures compute random linear measurements of a scene under view and reconstruct the image of the scene from the measurements. Scene under view can comprise light emanating from the object under view, where emanating can refer to radiating, transmitting, refracting, and/or reflecting from the object under view. The random linear measurements are inner products between an N-pixel sampled version of the incident light field from the scene and a set of two-dimensional basis functions. The inner product is implemented via a digital micromirror device (DMD) consisting of a two-dimensional array of N mirrors that reflect the light towards only a single photodetector or away from it. The photodetector integrates the incoming light and converts it to an output voltage that is related to the magnitude of the inner product between the scene and the basis function displayed on the DMD. Reconstruction of the image is possible by judicious processing of the set of estimated inner product values. One of the main limitations of the current single-pixel camera architecture is that it is restricted to a single wavelength band.

BRIEF DESCRIPTION

The present disclosure proposes a modification of the single-pixel camera architecture to extend it to multi-band while maintaining radiometric efficiency and the image acquisition rate of the single-band system. The proposed system comprises: (1) a light source that is projected onto the scene (this element is optional, as the system can work with ambient light); (2) a positive imaging lens that focuses the light field reflected from the scene onto a DMD array; (3) a DMD array configured to compute the pixel-wise product between the sampled version of the incident light and a set of basis functions; (4) a first photodetector module (including a collector lens) with a first spectral sensitivity that computes the magnitude of the inner product between the incident light and the basis functions; (5) a second photodetector module (including a collector lens) with a second spectral sensitivity that computes the magnitude of the inner product between the incident light and the complement of the basis functions; and, (6) a processing unit that reconstructs the dual-band spectral reflectivity of the scene from the measured inner products.

The present disclosure provides a system comprising: a light field emanating from a scene; a positive imaging lens focusing light from the light field emanating from the scene onto a DMD array; wherein the DMD array is configured to perform pixel-wise multiplication between light incident on the DMD and a predetermined first basis function via spatially modulated reflection of the light incident, where the spatially modulated light represents pixel-wise multiplication. The system further comprises: a first collector lens directing the spatially modulated light to a first photodetector module having a spectral sensitivity to a first spectral band; the first photodetector module sensing the directed light from the first pixel-wise multiplication and producing a signal representing a first inner product between the light incident on the DMD and the first basis function for the first spectral band; a second collector lens directing the spatially modulated light to a second photodetector module having a spectral sensitivity to a second spectral band; the second photodetector module sensing the directed light from the first pixel-wise multiplication and producing a signal representing a first inner product between the light incident on the DMD and the first basis function for the second spectral band; and, wherein the first photodetector and the second photodetector produce respective inner products substantially simultaneously.

The present disclosure further provides for a system comprising: a light field emanating from a scene; a positive imaging lens focusing light from the light field emanating from the scene onto a DMD array; the DMD array configured to perform pixel-wise multiplication between light incident on the DMD and a predetermined first basis function and a complementary basis function via spatially modulated reflection of the incident light, wherein the spatially modulated light reflected in a first direction represents a first pixel-wise product multiplication between the scene and the first basis function and the spatially modulated light reflected in a second direction represents a complementary pixel-wise multiplication between the scene and the complementary basis function; a first collector lens directing the spatially modulated first directed light to a first photodetector module having a spectral sensitivity to a first spectral band; the first photodetector module sensing the first directed light from the first pixel-wise multiplication and producing a signal representing a first inner product between the light incident on the DMD and the first basis function for the first spectral band; a second collector lens directing the spatially modulated second directed light to a second photodetector module having a spectral sensitivity to a second spectral band; the second photodetector module sensing the second directed light from the complementary pixel-wise multiplication and producing a signal representing a complementary inner product between the light incident on the DMD and the complementary basis function for the second spectral band; and, wherein the first photodetector and the second photodetector produce respective inner products substantially simultaneously.

The disclosure still further provides for a system comprising: a light field emanating from a scene; a positive imaging lens focusing light from the light field emanating from the scene onto a DMD array; the DMD array configured to perform pixel-wise multiplication between light incident on the DMD and a predetermined first basis function via spatially modulated reflection of the incident light, wherein the total intensity of the spatially modulated light represents pixel-wise multiplication; a first collector lens directing the spatially modulated light to a first photodetector module having a spectral sensitivity to a first spectral band; the first photodetector module sensing the spatially modulated light from the first pixel-wise multiplication and producing a signal representing a first inner product between the light incident on the DMD and the first basis function for the first spectral band; a second collector lens directing the spatially modulated light to a second photodetector module having a spectral sensitivity to a second spectral band; the second photodetector module sensing the spatially modulated light from the first pixel-wise multiplication and producing a signal representing a first inner product between the light incident on the DMD and the first basis function for the second spectral band; wherein the first photodetector and the second photodetector produce respective inner products substantially simultaneously; and, the DMD reconfigured to represent one or more additional basis functions, wherein the pixel-wise products for the first and the second spectral bands are produced for each the additional basis functions thereby generating multiple inner product signals for each additional spectral band.

DETAILED DESCRIPTION

Figure 1:
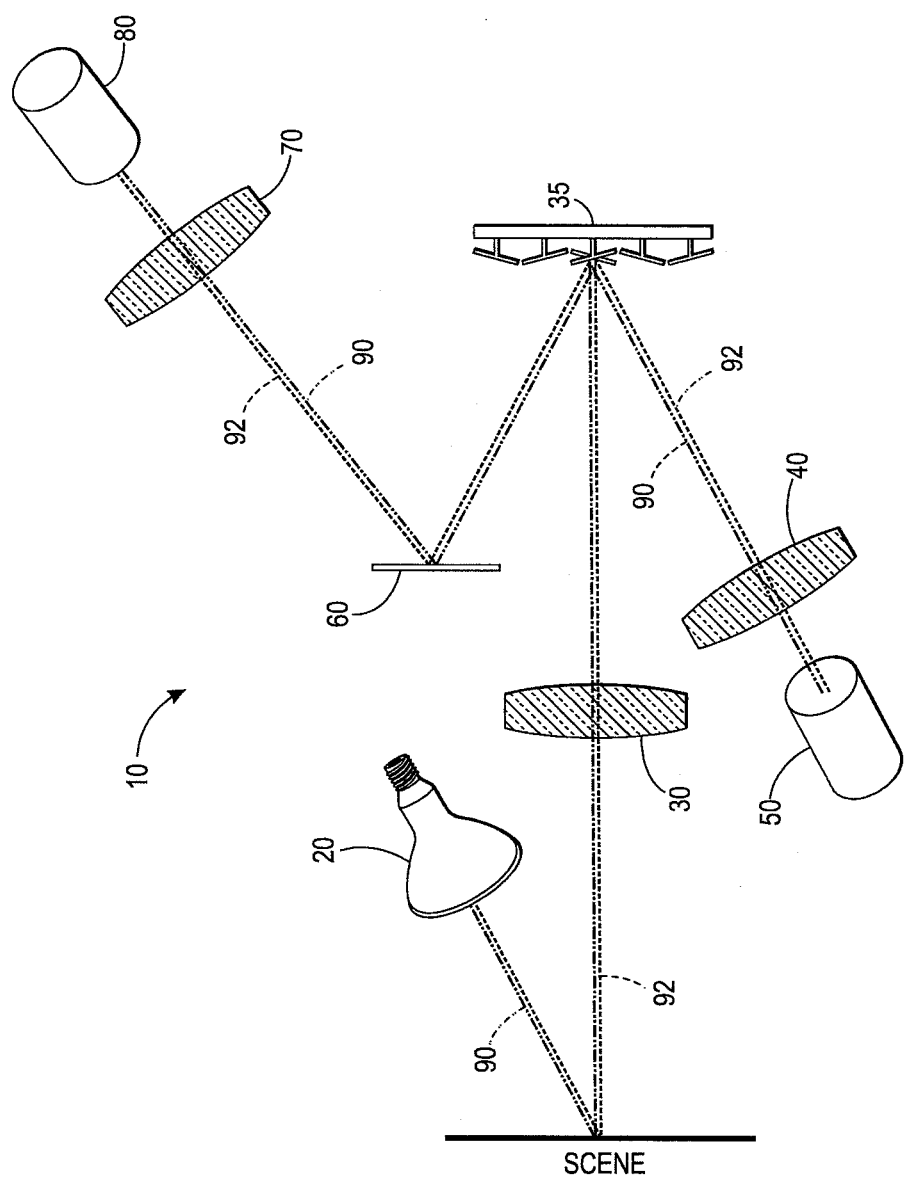
FIG. 1 is an exemplary architecture for a single-pixel camera that is at least dual-band capable; and, FIG. 2 is an alternative architecture for a single-pixel camera that enables multi-band acquisition based on a band selective beam splitter.

Consumer digital cameras in the megapixel range are commonplace due to the fact that silicon, the semiconductor material of choice for large-scale electronics integration, readily converts photons at visual wavelengths into electrons. On the other hand, imaging outside the visible wavelength range is considerably more expensive.

Hyperspectral and multispectral imaging, albeit very expensive, have a wide range of applications. The most notable examples include medical/healthcare imaging (e.g. human vitals monitoring) and transportation (e.g. occupancy detection and remote vehicular emissions monitoring). It is thus desirable to find a less expensive alternative to traditional multispectral imaging solutions. One alternative includes a single-pixel camera design which reduces the required cost of sensing an image by using one detector with specific sensitivity, rather than using a two-dimensional array of detectors with the associated sensitivity and at the added expense.

The potential applications that are enabled by relatively low cost extended IR image sensing are significantly enhanced by using more than one wavelength band (i.e. a dual-band single-pixel camera), and will be described in more detail hereinafter.

A traditional single-pixel camera can comprise the following modules: a light source for illuminating an object/scene to be captured; an imaging lens for focusing an image of the object onto a digital micromirror device (DMD); the DMD can perform pixel-wise multiplication between incoming light and a set of predetermined basis functions; a collector lens for focusing the light reflected from the DMD pixel-wise multiplication onto the photodetector; the photodetector measures a magnitude of the inner product in the form of light intensity and converts it to voltage; and, a processing unit for reconstructing the scene from inner product measurements as the various basis functions are applied over time.

In the traditional single-pixel camera arrangement, x[•] can denote the N-pixel sampled version of the image scene and $\phi_m[•]$ can be the m-th basis function displayed by the DMD. Then, each measurement performed by the photodetector corresponds to an inner product $y_m = \langle x, \phi_m \rangle$. The mirror orientations corresponding to the different basis functions are typically chosen using pseudorandom number generators (e.g. iid Gaussian, iid Bernoulli, etc.) that can produce patterns with close to 50% fill factor. In other words, at any given time, about half of the micromirrors in the DMD array are oriented towards the photodetector while the complementary fraction (i.e. the other half) is oriented away from it. By making the basis functions pseudorandom, the N-pixel sampled scene image x[•] can typically be reconstructed with significantly fewer samples than those dictated by the Nyquist sampling theorem (i.e., the image can be reconstructed after M inner products, where M<<N). In this case, N is the total number of mirrors in the DMD.

While this modus operandi has the aforementioned cost savings and sampling efficiency advantages, it has a few drawbacks. Firstly, given the 50% fill factor characteristics of the pseudorandom basis functions, the practical radiometric efficiency of a single-pixel camera is upper bounded by 50%. The reason 50% fill factor basis functions are desired is that they capture the largest amount of information possible under ideal illumination conditions. Deviations from the 50% fill factor results in reduced sampling efficiency (i.e. the extreme cases of 0% and 100% fill factors results in no information being captured).

Secondly, the traditional single-pixel cameras are inherently single-band because a single photodetector is used for the inner product measurement. This is a drawback because many of the potential applications can take advantage of multiband sensitivity. Given the desire to acquire multiple wavelength bands, an enhancement to the architecture can be made by incorporating multiple photodetectors, each with different spectral selectivity. For example, for 4-channel multispectral/hyperspectral imaging capability, four photodiodes sensitive to four different spectral bands can be combined into the collection and sensing unit. In this implementation, the 50% radiometric efficiency will be further divided by the number of photodetectors that split the light receiving area.

To be described in more detail hereinafter, a system is presented that avoids the aforementioned significant loss in radiometric efficiency, thereby enabling a practical multi-band single-pixel camera.

The present disclosure describes a novel single-pixel camera architecture (refer to FIG. 1) that is at least dual-band capable with high radiometric efficiency, while maintaining the same image capture rate as a single-band single-pixel camera. The improvements are achieved by adding a second photodetector module (including a collector lens) that makes use of the light that would be thrown away in the architecture described above. The modules of the proposed system 10 can comprise the following: a light source 20 for illuminating an object/scene to be captured; an imaging lens 30 for focusing an image of the object onto the DMD 35; the DMD 35 performs pixel-wise multiplication between incoming light 20 and a set of predetermined basis functions; a first collector lens 40 that projects the pixel-wise product between the scene and a first set of basis functions onto a first photodetector 50; the first photodetector 50 measures magnitude of the integrated inner product from the first set of basis functions in the form of light intensity from the first collector lens 40 and converts it to voltage; an optional mirror 60 can reflect the light field reflected from a second set of basis functions (complement of the first) towards a second collector lens 70 and a second photodetector 80; the second collector lens 70 projects the pixel-wise product between the scene and the second set of basis functions (complement of the first) onto the second photodetector 80; the second photodetector 80 measures magnitude of the integrated inner product from the second set of basis functions in the form of light intensity from the second collector lens 70 and converts it to voltage; and, a processing unit (not shown) can reconstruct the spectral reflectivity of the scene at the spectral bands of the first and second photodetectors 50, 80 from the measured inner products as the various basis functions are applied over time. It is to be appreciated that the scene under view, and the associated spectral reflectivity of the scene, can comprise light emanating from the object under view, where emanating refers to radiating, transmitting, refracting, and/or reflecting from the object under view. The light can be detected light emitted from the scene, as well as, infrared at various wavelengths A dual-band implementation of a modified version of the aforementioned modules could involve the first and second photodetectors being sensitive on different portions of the EM spectrum, and that their respective collector lenses be transmissive in the same bands. Equivalently, spectrally selective filters can be placed in the post DMD optical paths to select the spectral band sent to broader band photodetectors. Furthermore, the spectral content of the illumination source, the spectral reflectivity of the DMD, and the spectral transmittance of the imaging lens could all encompass both bands.

The present disclosure further provides for an alternative novel single-pixel camera architecture (refer to FIG. 2) that is at least dual-band capable with high radiometric efficiency, while maintaining the same image capture rate as a single-band single-pixel camera. The improvements are achieved by adding a second photodetector module (including a collector lens) that makes use of the light that would be thrown away in the prior art architecture described above. The modules of the proposed system 100 can comprise the following: a light source 200 for illuminating an object/scene to be captured; an imaging lens 300 for focusing an image of the object onto the DMD 350; the DMD 350 performs pixel-wise multiplication between incoming light and a set of predetermined basis functions; a first collector lens 400 that projects the pixel-wise product between the scene and a first set of basis functions onto a first photodetector 500; the first photodetector 500 measures magnitude of the integrated inner product from the first set of basis functions in the form of light intensity from the first collector lens 400 and converts it to voltage; a band-selective beam splitter 600 which can be transmissive for EM radiation in a first band 900 and reflective for EM radiation in a second band 920; the beam splitter 600 can reflect band 920 towards a second collector lens 700 and a second photodetector 800; the second collector lens 700 projects the pixel-wise product between the scene and the second set of basis functions (complement of the first) onto the second photodetector 800; the second photodetector 800 measures magnitude of the integrated inner product from the second set of basis functions in the form of light intensity from the second collector lens 700 and converts it to voltage; and, a processing unit (not shown) can reconstruct the spectral reflectivity of the scene at the spectral bands of the first and second photodetectors 500, 800 from the measured inner products as the various basis functions are applied over time.

Figure 2:
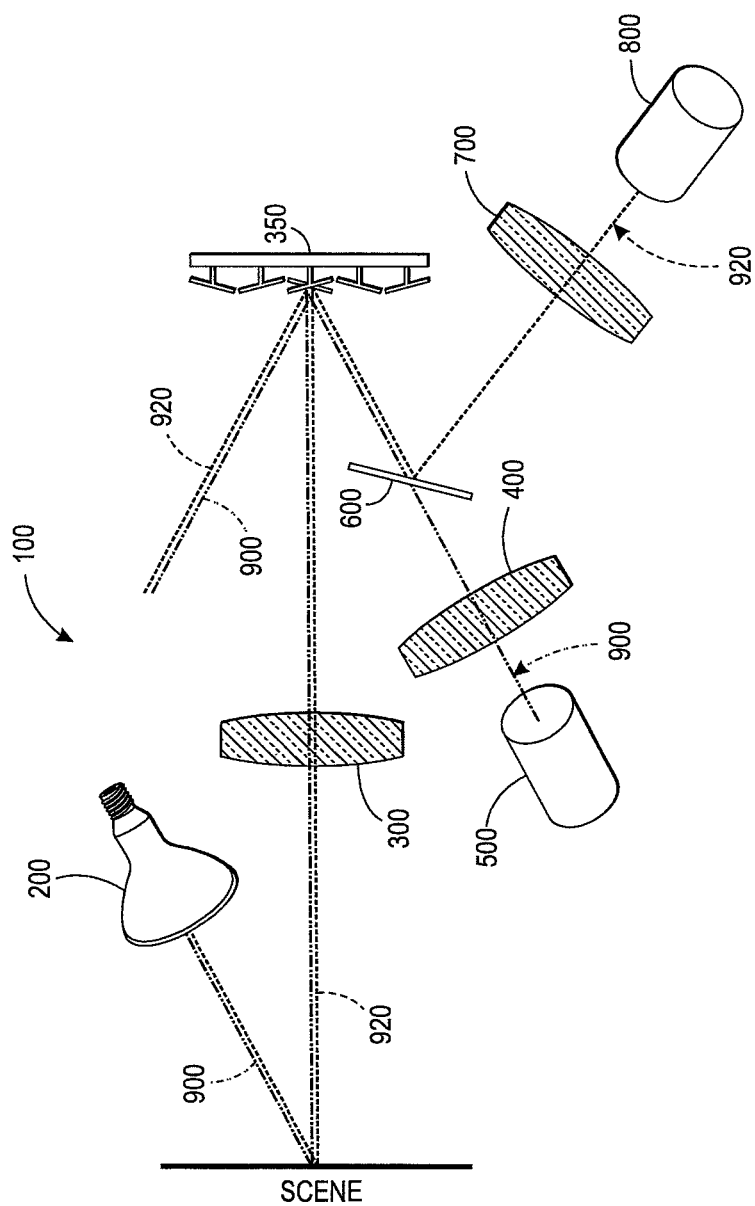

FIG. 1 represents a first exemplary embodiment of the present disclosure that is based on a dual-band architecture and optics. FIG. 2 represents an alternative dual-band architecture based a band-selective beam splitter (which can be transmissive for EM radiation in a first band and reflective for EM radiation in a second band). Such a beam splitter could be designed as an interference filter, prism, grating or other diffractive element. It is to be appreciated that the embodiments of FIGS. 1 and 2 could be combined to achieve multi band acquisition substantially simultaneously.

In one exemplary arrangement the system 10 provides a light field emanating from a scene. A positive imaging lens focuses light from the light field emanating from the scene onto a DMD array. The DMD array can be configured to perform pixel-wise multiplication between light incident on the DMD and a predetermined first basis function via spatially modulated reflection of the light incident, wherein the spatially modulated light represents pixel-wise multiplication. The system further provides a first collector lens directing the spatially modulated light to a first photodetector module having a spectral sensitivity to a first spectral band. The first photodetector module senses the directed light from the first pixel-wise multiplication and produces a signal representing a first inner product between the light incident on the DMD and the first basis function for the first spectral band. A second collector lens directs the spatially modulated light to a second photodetector module having a spectral sensitivity to a second spectral band. The second photodetector module senses the directed light from the first pixel-wise multiplication and produces a signal representing a first inner product between the light incident on the DMD and the first basis function for the second spectral band. The first photodetector and the second photodetector produce respective inner products substantially simultaneously.

The DMD device can be a bi-stable spatial light modulator comprising an array of micromirrors, each of which is independently controlled. The tilt angle of each micromirror can be set to +12° in the ON state and to −12° in the OFF state. Flat state occurs when the mirrors are not energized, and the nominal orientation of the mirrors in this state is nominally 0°. However, since the mirrors are not controlled or actuated to this position, their orientation may vary slightly in the flat state. In a dual band implementation, it would be desirable to keep the angle of incidence of the light field reflected from the scene onto the DMD plane as close to 90° as possible, so as to ensure the symmetry of the system. The further away this incidence angle is from perpendicular, the smaller the physical room left for the additional system components.

At any given moment, the first photodetector captures the inner product between the N-pixel sampled scene x[•] and the pseudorandom basis function $\phi^+_m[\bullet]$. The inner product is represented by the light intensity resulting from the multiplication of the object imaged onto the DMD and integrated via the first collector lens directing that light onto the first photodetector. Simultaneously, the second photodetector captures the intensity of the inner product between the N-pixel sampled scene x[•] and the complementary pseudorandom basis function $\phi^-_m[\bullet]$ that has been collected by the second collector lens. The following relationship holds for each basis coefficient:

$$\phi^-_m[\bullet]=1-\phi^+_m[\bullet]$$

It is to be appreciated that if $\phi^+_m[\bullet]$ is a pseudorandom sequence with 50% fill factor, then the resulting $\phi^-_m[\bullet]$ has the same desirable characteristics. As a way of illustration, it can be shown that the cases of two pseudorandom sequences representing the values of $\phi^+_m[\bullet]$, wherein a first sequence has values drawn from a (binary) Bernoulli distribution 0.5 mean (i.e. 50% fill factor) while the second sequence has values drawn from a [0,1] truncated Gaussian (continuous) distribution with 0.5 mean. Values of $\phi_m[\bullet]$ between 0 and 1 for sequences drawn from continuous distributions can be obtained by dithering the mirrors back and forth during the photodiode integration time. In both cases, the resulting complementary pseudorandom basis functions are also Bernoulli and Gaussian with 0.5 mean. This relationship holds for any pseudorandom sequence drawn from distributions that are symmetric about 0.5, which satisfies the 50% fill factor condition on the basis functions.

A processing unit (not shown) acquires the signals from the M basis functions as they are applied to the DMD over time, and constructs an image of the object at the given spectral bands.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:
1. A system comprising:
a light field emanating from a scene;
a positive imaging lens focusing light from said light field emanating from said scene onto a DMD array;
said DMD array configured to perform pixel-wise multiplication between light incident on the DMD and a pre- determined first basis function and a complementary basis function via spatially modulated reflection of said light incident, where the spatially modulated light reflected in a first direction represents a first pixel-wise multiplication between the scene and said first basis function and the spatially modulated light reflected in a second direction represents a complementary pixel-wise multiplication between the scene and said complementary basis function;

a first collector lens directing the spatially modulated first directed light to a first photodetector module having a spectral sensitivity to a first spectral band;

said first photodetector module sensing the first directed light from the first pixel-wise multiplication and producing a signal representing a first inner product between said light incident on the DMD and said first basis function for the first spectral band;

a second collector lens directing the spatially modulated second directed light to a second photodetector module having a spectral sensitivity to a second spectral band;

said second photodetector module sensing the second directed light from the complimentary pixel-wise multiplication and producing a signal representing a complementary inner product between said light incident on the DMD and said complementary basis function for the second spectral band;

wherein said first photodetector and said second photodetector produce respective inner products substantially simultaneously; and, said DMD is additionally reconfigured to represent one or more additional basis functions, wherein said pixel-wise products for said first and said second spectral bands are produced for each said additional basis functions thereby generating multiple inner product signals for each additional spectral band, and a processing unit reconstructs a dual-band spectral representation of said scene, wherein a first spectral band representation is obtained from the first spectral band inner products and a second spectral band representation is obtained from the second spectral band inner products.

2. The system according to claim 1, further comprising:
a processing unit reconstructing a dual-band spectral representation of said scene, wherein a first spectral band representation coming from said first spectral band and a second spectral band representation coming from said second spectral band.

3. The system according to claim 1, wherein said emanating light field is selected from at least one of radiant and reflective.

4. The system according to claim 1, wherein a magnitude of said first inner product of said first photodetector is in the form of a first light intensity from said first collector lens; and,
said first photodetector converts said first light intensity to voltage.

5. The system according to claim 4, wherein said magnitude of said first inner product of said second photodetector is in the form of a second light intensity from said second collector lens; and,
said second photodetector converts said second light intensity to voltage.

6. A system comprising:
a light field emanating from a scene;
a positive imaging lens focusing light from said light field emanating from said scene onto a DMD array;
said DMD array configured to perform pixel-wise multiplication between light incident on the DMD and a predetermined first basis function via spatially modulated reflection of said light incident, wherein the total intensity of the spatially modulated light represents pixel-wise multiplication;
a first collector lens directing said spatially modulated light to a first photodetector module having a spectral sensitivity to a first spectral band;
said first photodetector module sensing said spatially modulated light from the first pixel-wise multiplication and producing a signal representing a first inner product between said light incident on the DMD and said first basis function for said first spectral band;
a second collector lens directing said spatially modulated light to a second photodetector module having a spectral sensitivity to a second spectral band;
said second photodetector module sensing said spatially modulated light from the first pixel-wise multiplication and producing a signal representing a first inner product between said light incident on the DMD and said first basis function for said second spectral band;
wherein said first photodetector and said second photodetector produce respective inner products substantially simultaneously;
said DMD reconfigured to represent one or more additional basis functions, wherein said pixel-wise products for said first and said second spectral bands are produced for each said additional basis functions thereby generating multiple inner product signals for each additional spectral band; and,
a processing unit reconstructing a dual-band spectral representation of said scene, wherein a first spectral band representation coming from the first spectral band inner products and a second spectral band representation coming from the second spectral band inner products.

* * * * *